United States Patent
Moore, Jr. et al.

(10) Patent No.: US 9,840,040 B2
(45) Date of Patent: Dec. 12, 2017

(54) PLASTIC TANK HAVING FUSION WELDED PARTS

(71) Applicants: Roy E Moore, Jr., Killingworth, CT (US); Paul R Holbrook, Old Saybrook, CT (US)

(72) Inventors: Roy E Moore, Jr., Killingworth, CT (US); Paul R Holbrook, Old Saybrook, CT (US)

(73) Assignee: INFILTRATOR WATER TECHNOLOGIES LLC, Old Saybrook, CT (US)

( * ) Notice: Subject to any disclaimer, the term of this patent is extended or adjusted under 35 U.S.C. 154(b) by 0 days.

(21) Appl. No.: 14/809,124

(22) Filed: Jul. 24, 2015

(65) Prior Publication Data

US 2016/0207254 A1    Jul. 21, 2016

Related U.S. Application Data

(60) Provisional application No. 62/028,425, filed on Jul. 24, 2014.

(51) Int. Cl.
*B29C 65/34* (2006.01)
*B65D 88/76* (2006.01)
(Continued)

(52) U.S. Cl.
CPC .......... *B29C 65/342* (2013.01); *B29C 65/348* (2013.01); *B29C 66/1312* (2013.01);
(Continued)

(58) Field of Classification Search
CPC ...... B65D 90/024; B65D 90/02; B65D 88/76; B65D 90/08; F17C 2203/00;
(Continued)

(56) References Cited

U.S. PATENT DOCUMENTS

| 227,239 A | 5/1880 | Frentress |
| 2,764,545 A | 9/1956 | Primick |

(Continued)

FOREIGN PATENT DOCUMENTS

| WO | WO9713692 A1 | 4/1997 |

OTHER PUBLICATIONS

Powercore International, Ltd., "Welding Thick Plastics", website printout, Mar. 12, 2014, (3 pgs.) www.powercore.com/welding_thick.htm.

(Continued)

*Primary Examiner* — Jacob T Minskey
*Assistant Examiner* — Vishal I Patel
(74) *Attorney, Agent, or Firm* — C. Nessler

(57) ABSTRACT

A large tubular plastic tank, for use in holding unpressurized water or wastewater, is formed by fusion welding together half-shell parts at lengthwise flange joints to form a tubular body. Then, end caps are fusion welded onto the outermost ends of the tubular body and an assembly of two or more bodies. Fusion weld elements are secured beforehand to the joining surfaces of the tank parts at a factory; the tank parts are then economically stored or shipped in nested condition to a fabrication site remote from the manufacturing site. Electric or electromagnetic energy is used to melt in situ the fusion weld elements which are captured between the joining surfaces of the parts.

14 Claims, 7 Drawing Sheets

(51) Int. Cl.
  *B65D 90/08* (2006.01)
  *B29C 65/00* (2006.01)
  *B29L 31/00* (2006.01)
  *B29C 65/36* (2006.01)

(52) U.S. Cl.
  CPC .......... *B29C 66/232* (2013.01); *B29C 66/547* (2013.01); *B29C 66/5432* (2013.01); *B29C 66/73921* (2013.01); *B65D 88/76* (2013.01); *B65D 90/08* (2013.01); *B29C 65/362* (2013.01); *B29C 65/368* (2013.01); *B29C 66/71* (2013.01); *B29L 2031/7126* (2013.01)

(58) Field of Classification Search
  CPC ............ F17C 2209/00; F17C 2209/232; F17C 2209/234; B29L 2031/7126; B29K 2023/06; B29K 2023/12; B29C 65/342; B29C 66/73921; B29C 66/71; B29C 66/547; B29C 65/348; B29C 65/362; B29C 65/368; B29C 66/1312; B29C 66/232; B29C 66/5432
  See application file for complete search history.

(56) References Cited

U.S. PATENT DOCUMENTS

| | | | |
|---|---|---|---|
| 3,426,903 A | 2/1969 | Olecko | |
| 4,036,390 A * | 7/1977 | Morse | B65D 90/08 220/4.13 |
| 4,261,947 A | 4/1981 | Ogi | |
| 4,305,518 A | 12/1981 | Boyd | |
| 4,579,242 A | 4/1986 | Ellis, III | |
| 4,878,978 A | 11/1989 | Goel et al. | |
| 5,407,514 A * | 4/1995 | Butts | B29C 63/24 156/273.7 |
| 5,453,149 A | 9/1995 | Szczesniak | |
| 6,284,089 B1 | 9/2001 | Anderson et al. | |
| 6,412,650 B1 | 7/2002 | Warner | |
| 6,588,970 B1 | 7/2003 | Natrop | |
| 7,350,660 B2 | 4/2008 | Van Schepdael et al. | |
| 7,854,338 B2 | 12/2010 | Graff | |
| 7,984,738 B2 | 7/2011 | LaMarca et al. | |
| 8,372,229 B2 | 2/2013 | Silagyi | |
| 2006/0068141 A1 * | 3/2006 | Tsutsumi | B29B 9/14 428/36.4 |

OTHER PUBLICATIONS

Powercore International, Ltd., "General Introduction", website printout, Feb. 19, 2014, (7 pgs.) www.powercore.com/general_introduction.htm.

Emabond Solutions, Co., "Electromagnetic Welding/Bonding", website printout, Feb. 19, 2014, (4 pgs.) http://emabond.com/electromagnetic.html.

* cited by examiner

PLASTIC TANK HAVING FUSION WELDED PARTS

This application claims benefit of provisional patent application Ser. No. 62/028,425, filed on Jul. 24, 2015, the entire disclosure of which is hereby incorporated by reference.

TECHNICAL FIELD

The present invention relates to molded plastic tanks, particularly those which are suited for unpressurized storage or treatment of water, including wastewater treatment tanks.

BACKGROUND

The present invention is concerned with manufacturing large plastic tanks having capacities of 500-10,000 gallons or more for containment or treatment of unpressurized liquids, most particularly storage tanks and septic tanks for wastewater treatment.

Compared to using steel or concrete as tank materials, plastics have desirable lightness and corrosion resistance. Fiberglass reinforced resin has been a familiarly used material. However tanks made of such can involve slow and costly hand or automated manufacturing processes, particularly when a tank has large ports or complicated details, such as many heavy corrugations. Heretofore, large tanks have been made by blow molding and rotational molding of thermoplastics. See the Lombardi U.S. Pat. No. 7,144,506 and Moore et al. U.S. Pat. No. 8,151,999. Even though large and costly molds are associated with rotational and blow molding, the production rate can be high compared to making fiberglass reinforced resin tanks.

In general, shipping large hollow plastic tanks has always been costly because the items are not susceptible to good packing. One way in which that can be addressed is by making a tank in pieces and assembling the pieces at a remote location near the point of use. Large plastic tanks have also been made as multi-piece assemblies of both fiberglass and plastic. See the multi-part tank of Olecko U.S. Pat. No. 3,426,903 and the two-piece tank of Perry U.S. Pat. No. 5,361,930. If there is an effective way for mating the parts securely and forming a seal at the joints, then half-tanks can be shipped in nested condition, for assembly as whole tanks near the point of use. However, those remote sites may have limited fabricating equipment and fixtures.

Half-tanks have been injection molded and then joined to each other by clamping or welding to form a whole tank. For example, see commonly owned Holbrook et al. U.S. Pat. No. 8,740,005. An advantage of injection molding tank parts is that better control and repeatability is obtained over the dimensions, particularly wall thickness. Large injection molds and machines can be quite costly. Therefore, that makes it economically infeasible to have multiple manufacturing sites, when volume of product is not sufficiently large.

There is a continuing need for improved means for making large and very large tanks and other tubular plastic structures which are assemblies of smaller tank parts so that the tanks are susceptible to mass production, so the parts can be reliably assembled by modestly skilled labor, and so the tanks are sufficiently strong and liquid tight. The present invention addresses that need.

SUMMARY

An object of the invention is to make large thermoplastic tanks and tubular structures in forms which can be compactly stored and shipped, and which can be manufactured economically and assembled into finished products in a reliable way. A further object of the invention is to improve methods for fusion welding parts of multi-part plastic tanks.

In an embodiment of the invention, a tubular plastic tank is formed by fusion welding together half-shell parts (optionally, other fractional shell parts) to form a tubular body; and then fusion welding end caps to the outermost open ends of the tubular body. Optionally, one or more additional tubular bodies are similarly formed and attached to the first body, or attached serially, prior to putting on the end caps. An exemplary half-shell has two opposing end flanges and two opposing side flanges, all with associated joining surfaces for mating with a like half-shell, either lengthwise or endwise. Preferably, a fusion weld element is secured to only one of the lengthwise joining surfaces and only one of the semi-circumferential ends of each half shelf. When two like half-shells are mated, as a result there is a fusion weld element in each lengthwise joint. Fusion weld elements are tack welded selectively to the joining surfaces of the tank parts in the factory where the parts are molded. Electric or electromagnetic energy is used to melt in situ the fusion weld element, to make a weld and form a tubular body with open ends.

In an embodiment of the invention, a second fusion weld element is secured to one of the semi-circumferential ends of each half-shell; and the half-shells are joined together as a tubular body, an end of the tubular body has two semi-circumferential fusion weld elements on the joining surface. The circumferential joining surface of another end shell, or the joining surface of an end cap, can be mated with the circumferential surface of the tubular body which has the fusion weld elements, and with applied electric/electromagnetic energy, welded to it. A second end cap may be welded to the remaining open end of the partially formed structure, as by positioning a fusion weld element on the face of the end cap.

In an embodiment of a method of the present invention, two tabs are molded on one of the ends of each half-shell; each tab extends parallel to, and beyond the end of, one of the lengthwise joining surfaces. The tabs form mated pairs when half-shells are mated and each fusion weld element exits the joint, sandwiched between the tab pairs. During the welding process the tabs fuse to each other, and they are then severed from the end of the now-formed tubular body. This procedure avoids a defect in the end of the now-formed tubular body which could disrupt the subsequent circumferential welding processes.

In another method embodiment of the present invention, the fusion weld element which is secured to the end of a half-shell ends is longer than the arc path which the element follows on the semi-circumferential end joining surface. A fusion weld element is preferably a loop, with the loop end secured to the semi-circumferential joining surface near the point where it intersects the lengthwise joining surface. So when two half-shells are attached to each other, the terminal ends of each fusion weld element loop circumferentially overlap the loop end of the other fusion weld element. Preferably, the two terminal ends of one fusion weld element on one half-shell are run across the lengthwise joint between the half-shells and through spaced apart holes in the joining surface of the other half-shell, adjacent the ends of the loop of the other fusion weld element.

In an embodiment of the invention, a fusion weld element is secured to one of the lengthwise joining surfaces and one of the semi-circumferential ends of the half-shell at a factory; and the half-shells (along with end caps) are nested and shipped to a distribution site or a site near the point of use, where the parts are assembled and welded as described. This methodology saves shipping and storage costs.

The foregoing and other objects, features and advantages of the present invention will become more apparent from the following description of preferred embodiments and accompanying drawings.

DESCRIPTION

Figure 1:
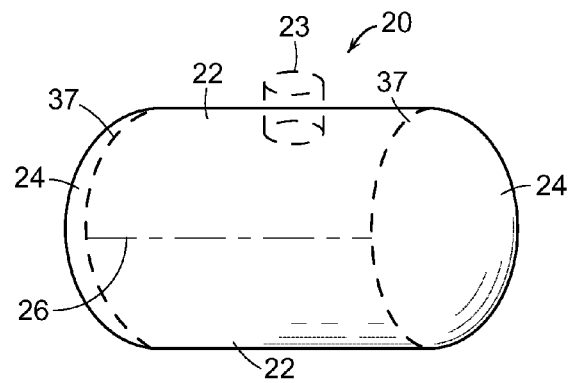
FIG. 1 is a perspective schematic view of a molded plastic tank comprised of multiple segments.
Figure 2:
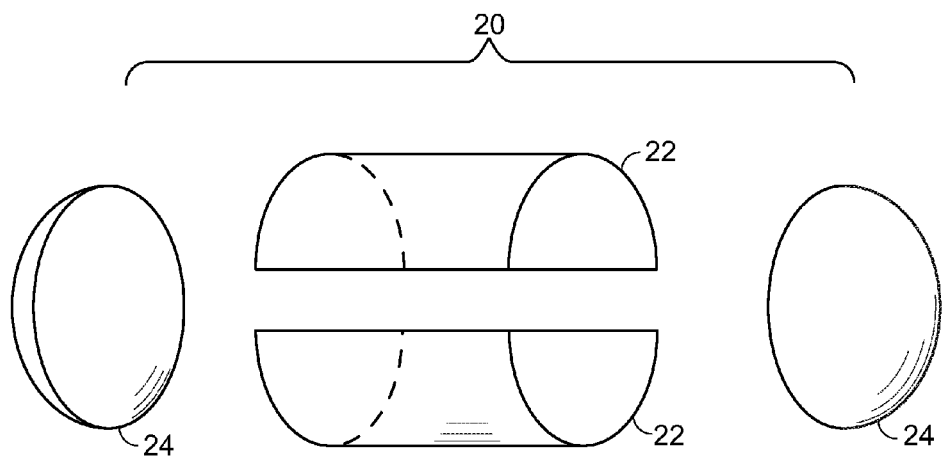
FIG. 2 shows the tank of FIG. 1 in exploded view.
Figure 3:
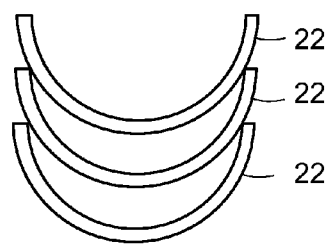
FIG. 3 is an end view of body segments of the tank of FIG. 1 as they are stacked for storage or shipment.

FIG. 1 shows a plastic tank 20 comprised of a multiplicity of joined together parts; FIG. 2 shows the tank in exploded view; and FIG. 3 shows nested semi-cylindrical body segments in end view. The illustrations in FIG. 1-3 are largely schematic and they are prelude for description of FIG. 4-6. Tank 20 is comprised of a multiplicity of parts: Two semi-cylindrical half-shells 22 mate with each other to form the cylindrical (tubular) body of the tank, and a pair of end caps 24 close off the ends of the body. FIG. 3 shows how the half-shells 22 nest for convenient storage or shipment. Similarly, the end caps will nest.

In other embodiments of the invention the half-shells, which are connected to make a tubular body portion, may be smaller than half-tanks. For instance, quarter-cylinder segments may be used. While the remainder of this exemplary description is about half-tanks, it applies to third-tanks, quarter-tanks, etc. While exemplary tanks of FIG. 1-3 have a circular cross section, in the generality of the invention a tank may have some other cross section, such as oval or rectangular. A reference herein to the circumference of a tank, and variations on it and the root word, is a reference to a circumscribing dimension of such a tank in a plane transverse to the length, even when the tank is not round.

To fabricate a tank 20, the several parts are first molded. Then the half-shells 22 are connected to each other at lengthwise joints 26 to form a tubular body; then, the end caps 24 are connected to the ends of the body at circumferential joints 37. By fabricating a two or more tubular bodies and joining them end-to-end, an assembler-user can select a desired length and volume capacity of tank.

One or more hatchways 23, shown in phantom in FIG. 1, may be attached to the tubular body where part of the wall is cut away or omitted. Optionally, bosses for cutting of ports may be formed as an integral part of the tank, as described below for tank 120.

Different means may be used to join the tank parts 22, 24 to each other, including either or more than one of mechanical fastening or clamping, adhesive bonding, and welding. Joining by mechanical fastening (i.e., bolts) and clamping is generally described in the prior art referred to in the Background.

The joints between the connected parts of a tank in the present invention are fused. While conventional plastic welding (e.g., hot air with filler rod or hot plate welding) might be used, a better welding means is described below. It is especially useful when assembly is anticipated at a field site where there may be limited skilled workers, equipment, and fixturing.

Figure 7:
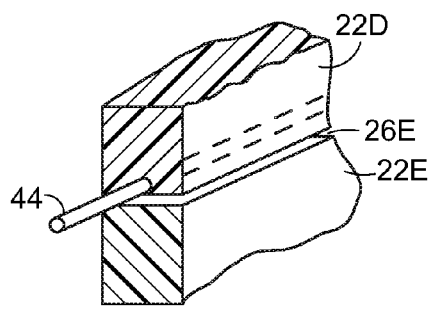
FIG. 7 is a perspective and partial cutaway view of the joint between two half-shells of a tank, where a fusion weld element is embedded in one half-shell near the joint.
Figure 8:
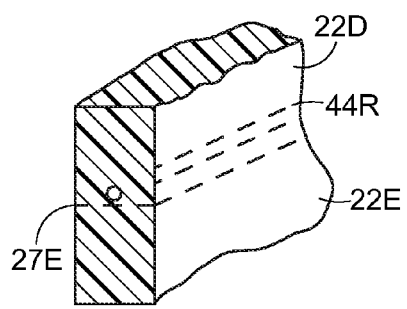
FIG. 8 is like FIG. 7 and shows the parts after the fusion weld element has been energized sufficiently to melt and fuse the joints.

FIG. 7 and FIG. 8 illustrate a basic approach to obtaining a fused joint between the joining surfaces (also called faying surfaces) of representative half-shells 22D, 22E where they meet at joint region 26E. In FIG. 7, a fusion weld element 44 is embedded in the plastic of half-shell 22D, prior to fusing of the joint 26E. In the present invention a fusion weld element is a component which can be heated by electrical or electromagnetic energy, sufficient to cause localized melting and fusion of both the element and the local plastic material of the parts being joined. Exemplary fusion weld elements comprise plastic with embedded metal pieces that are heated by electric resistance or electromagnetic induction are described further below. Commercial products are described below.

Placement of a fusion weld element may be accomplished in different ways. For example, the fusion weld element 44 may be molded into the material of the half-shell 22D when it is formed, as suggested by the illustration of FIG. 7. Alternately, the element may be placed partly or wholly within in a groove on one of the faying surfaces; alternately, the element may be simply captured between the faying faces as they are pressed toward each other. Preferably, in the present invention, the fusion weld elements are tack welded with plastic to a joining (faying) surface. In FIG. 8 the parts 22D, 22E are shown after the fusion weld element 44 has been raised in temperature sufficient to melt the mating plastic surfaces, and then cooled. The weld joint 27E (where previously was located joint region 26E) is fused plastic which weld-joins the two parts. Some metal artifact from the metal portion of the fusion weld element may remain within the fused weld material.

Fusion weld element 44 (which sometimes may be called fusion element or weld element herein) is a component which may be heated, such as by electric resistance heating or electromagnetic induction heating to induce melting of the element and local plastic environment. As an example, the fusion weld element may be a commercial product known as PowerCore™ Welding Rod (PowerCore International Ltd., Ottawa, Ontario, Canada). See also U.S. Pat. Nos. 5,407,514 and 5,407,520, the disclosures of which are hereby incorporated by reference. An exemplary PowerCore brand rod is an about 3/16 inch diameter thermoplastic rod having integrated electric resistance wires of very fine diameter. The ends of the rod run out of the joint/part at selected end points; and when the wires comprising the rod are connected to an electric power source they rise in temperature and heat the rod and surrounding plastic causing melting and fusion. The fine wires remain a part of the finished joint. That portion of the fusion weld element which sticks from the end of the joint is severed, as by chiseling, and discarded.

As another example, the fusion weld element may be the preform which is part of the commercial Emabond™ electromagnetic welding system (Emabond Solutions Co., Norwood, N.J., U.S.) As described in Lamarca U.S. Pat. No. 7,984,738 (the disclosure of which is hereby incorporated by reference) the fusion weld element preform may be a structure comprised of plastic and magnetic particles. When an energized high frequency induction coil is placed in proximity to the joint, the particles act as susceptors of electromagnetic radiation and resultant induced eddy currents cause the element to become heated sufficiently to melt the preform and adjacent plastic, thereby fusing the joint. The metal particles remain within the fused plastic part.

Figure 4:
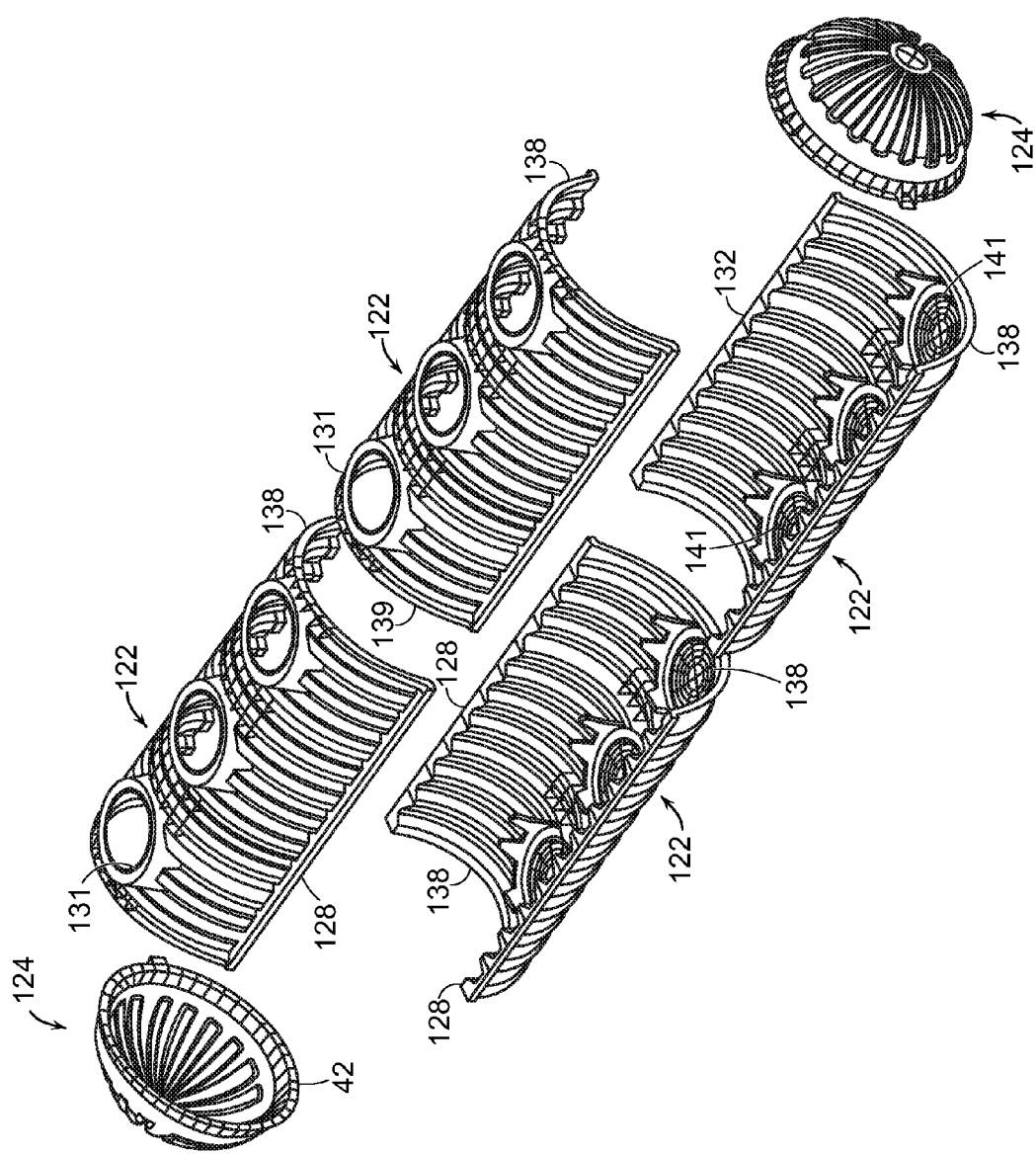
FIG. 4 is an exploded of the parts of a molded plastic septic tank having two tubular body pieces.
Figure 5:
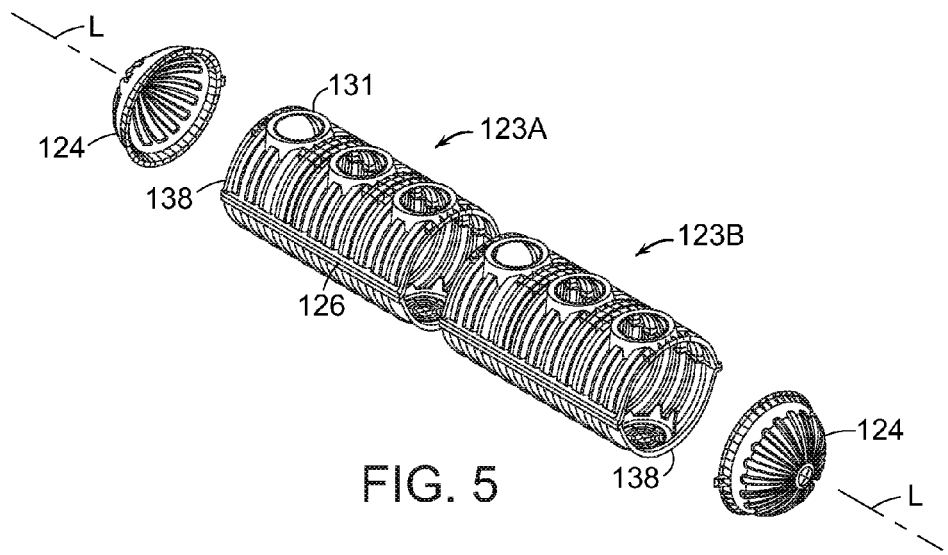
FIG. 5 shows the parts of the tank of FIG. 4 partially assembled as two tubular bodies.
Figure 6:
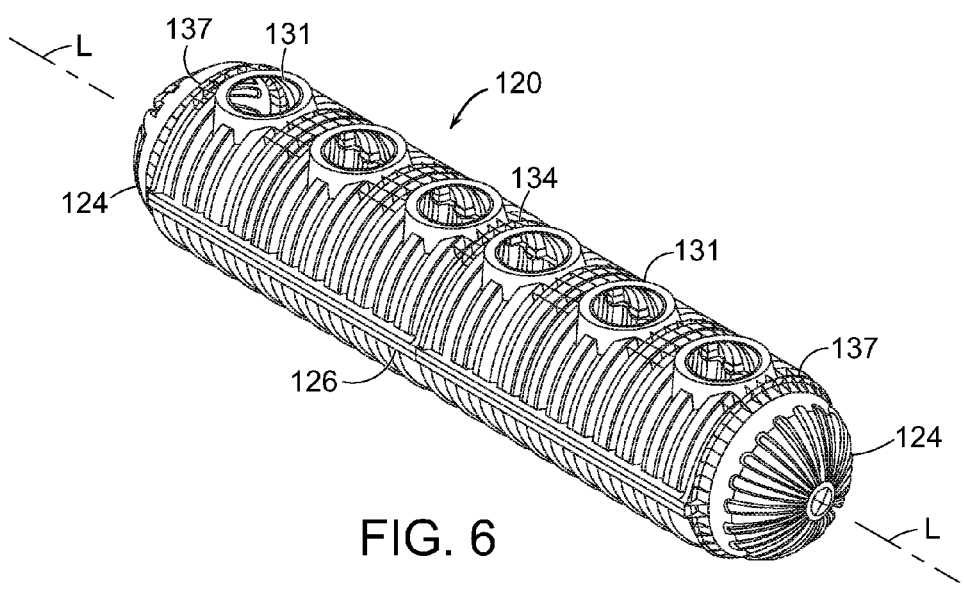
FIG. 6 is a perspective view the tank of FIG. 4.

FIG. 4-6 show respectively, exploded, partially assembled, and assembled views of a plastic septic tank 120, which views generally correspond with FIG. 1-3. They are now discussed. FIG. 6 shows a large corrugated plastic septic tank 120, an embodiment of the present invention. FIG. 4 shows the tank in exploded view, and FIG. 5 shows the tank in partially assembled view, where two tubular body portions have been formed from half-shells. Tank 120 is comprised of separately injection-molded parts, preferably made of polyethylene or polypropylene. Other molding means may be used, although generally they are less precise in forming parts. Tank 120 has corrugations which are similar in character to those of a half tank described in U.S. Pat. No. 8,740,005. Tank 120 preferably has a nearly round cross section (compared to a tank having a nearly rectangular cross section, as described in the foregoing patent). Within the present invention, a tank may have—and likely will have—a non-round cross section. For convenience of description, the terms "cylindrical" and "circumferential" are used, but will be understood to be approximations, and the description and invention will apply to non-round tanks.

With reference to FIG. 5 and FIG. 6, tank 120 is comprised of two generally cylindrical tubular subassemblies 123A, 123B that are attached to each other along longitudinal axis L at tank-center joint 134. As shown by FIG. 4, each tubular body subassembly 123A, 123B is constructed by welding a pair of semi-cylindrical tank half-shells 122 to each other at lengthwise faying surfaces 128 to form a weld joint 126. The term faying surface is used interchangeably with joining surface herein. Each part of tank 120 has a flange where there is a weld joint to be made, for both stiffness and convenience, to increase the size of the faying surface and weld joint area and impart stiffness to the structure comprising the joint region.

Preferably, every tank half-shell 122 is identical. Each half-shell is molded with a plurality of bosses 141. FIG. 4-6 illustrate how the several bosses which face upwardly on tank 120 may be cut out to provide access ports 131. The access ports are desirable when a tank is used for septic tank purpose. Covers or optional risers may be attached to the tank at or adjacent to the openings 131 during use of the tank. In septic tank application, the bosses 141 at the bottom of the tank are not cut out; they help provide a stable base for supporting tank 120 on a flat surface.

When the body is formed by to create the tubular body parts 123A, 123B shown in FIG. 5, and the body parts 123A, 123B are joined to each other at joint 134, with any weld flash clean up as is needed, the resultant tubular body has opposing open ends which are circumferential, more particularly in some instances, circular. Each end has an associated planar joining surface 138. Referring to FIG. 6, each end cap 124 is then fusion welded so it is attached by a weld joint 137 to one end of the tubular body pair at the surface 138.

Preferably, tank 120 is fabricated by permanently welding the parts 122, 124 to each other by using the kind of fusion weld elements mentioned above, most preferably a PowerCore commercial product. To make a joint, the electrical conductor ends of a fusion weld element are connected to a source of electric energy (emf), which causes current flow to flow through the fusion weld element. The resistance to passage of the current causes heating of the metal parts of fusion weld element which melts the plastic part of the fusion weld element which causes local melting of the molded plastic parts which are mated. Each element therefore has two terminal ends, that is, there are electric lead portions which are suited for connection to a power source or to lines from a power source. A fusion weld element may be run within a joint as one or more single strands; or it may be doubled back on itself in the form or a loop. In a circular joint a single strand fusion weld element may be run around the circumference more than one time, i.e., it may be a spiral. Preferably, the fusion weld elements are secured by plastic tack welding of the element to a faying surface. Optionally, the alternate means for holding a fusion weld element in place, described above in connection with FIG. 7-8, may be used.

FIG. 9-14 show ways in which fusion weld elements may be placed on the tank parts. (In these Figures, the corrugations that characterize the parts of tank 120 are not shown for simplicity of illustration.)

Figure 9:
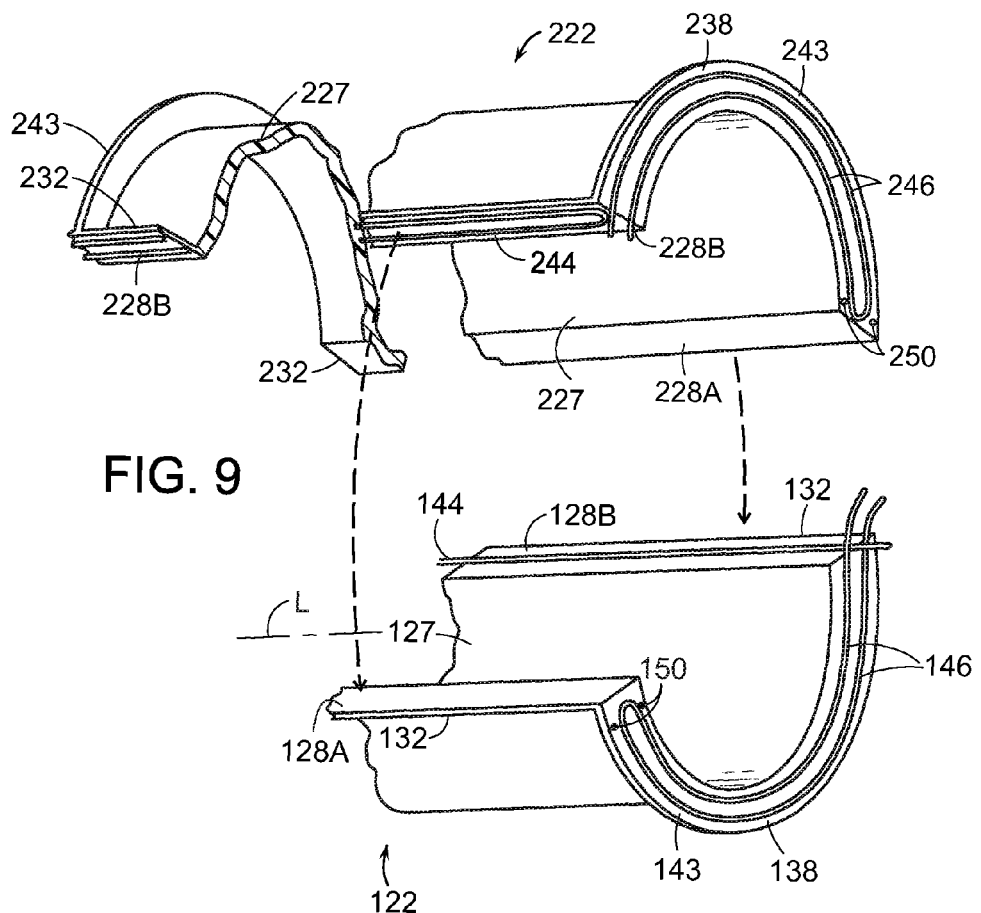
FIG. 9 is a perspective view of portions of two tank half-shells ready to be mated, showing the placement of fusion weld elements on the joining surfaces.

FIG. 9 shows two typical semi-circumferential half-shells 122, 222 ready to be mated. The half-shells are identical, that is, they are like the parts 122 referred to above. (For this part of the description, the parts of the upper half-shell in FIG. 9 and those which derive from it have the prefix "2", to enable distinction to be made between the parts of the lower half-shell which have the prefix "1".)

Half-shells 122, 222 have respective walls 127, 227. Each half-shell has a respective pair of lengthwise flanges 132, 232 which have faying surfaces 128A, 128B, 228A, 228B. Each half-shell lengthwise end comprises a flange 143, 243 upon which is the semi-circumferential faying surface 138, 238.

In this aspect of the invention, a fusion weld element is placed on only one of the lengthwise faying surfaces of a half-shell, namely on one of the surfaces and not on the other lengthwise faying surface of the same half shell, i.e. on surface 128A or 128B, and on surface 228A or 228B. And a fusion weld element is placed on only one of the semi-circumferential faying surfaces 138, 238 at the ends of the half-shell, and not on the other.

In FIG. 9, fusion weld elements 144, 244 have been secured to only one lengthwise joining surface on each tank, preferably by tacking, so that when the half-shells are mated, as shown by the arrows in FIG. 9, each fusion weld element will be captured within the joint region between the half-shells.

To enable forming a weld joint between an end cap 124 and the body 123 that is created when the half-shells 122, 222 are welded to each other, a second fusion weld element 146, 246 is tacked onto the joining surface 138, 238 at the end of each half-shell 122, 222. Each second fusion weld element runs on a semi-circular arc, preferably as a loop, described below. There is no fusion weld element attached to the surface which is at the opposing end of each half-shell 122.

When the half-shells 122, 222 are mated, the two fusion weld elements 146, 246, which are tacked onto the joining surfaces 138, 238 of the end flanges, cooperate to run around the entirety of circular joining surface at the end of a tubular body assembly 123. Thus surface which is the summation of surfaces 138 and 238 is ready to mate with and be welded to an end cap 124 having a plain faying surface, i.e., a surface which has no tacked-on fusion weld element, or with the like no-element faying surface of a second tubular body 123.

Figure 12:
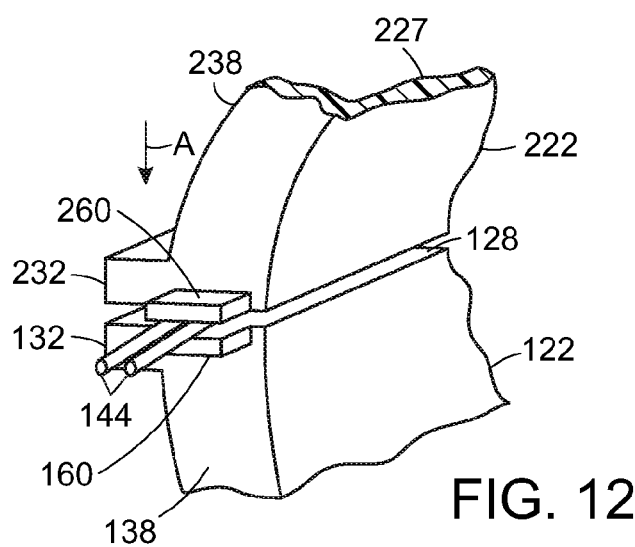
FIG. 12 is a fragmentary perspective end view two mated half-shells, showing how a fusion weld element is captured in the joint and between tabs which are extensions of the joint.
Figure 13:
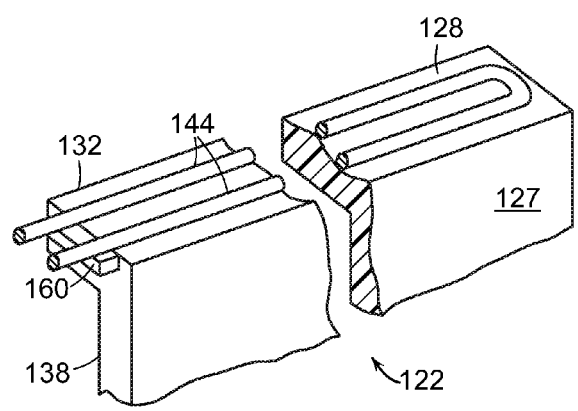
FIG. 13 shows one of the half-shells of FIG. 12, and the fusion weld element tacked to the faying surface.
Figure 14:
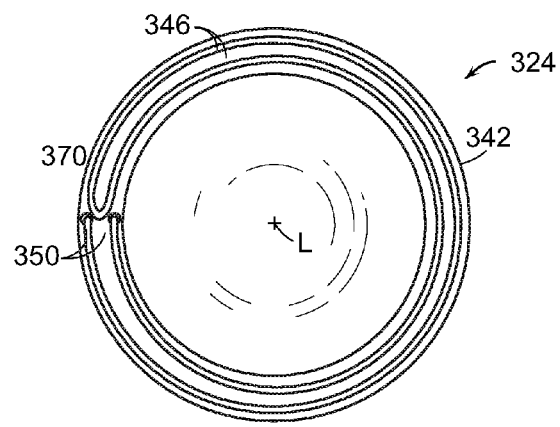
FIG. 14 shows an end cap with a single loop type fusion weld element tacked to the faying surface.

FIG. 12 is a partial perspective view showing portions of half-shells 122, 222 in mated disposition, preparatory to fusion welding. Fusion weld element 144 is captured between the joining surface 128 and the mating joining surface of half-shell 222. When fusion weld element 144 is heated by being connected to a power supply, force is applied in directions indicated by vector A to push the flanges 132, 232 together. FIG. 13 shows only the bottom half-shell 122 of the set in FIG. 12. FIG. 13 illustrates how preferred fusion weld element 144 runs in a loop along the faying surface 128 so that both power-connection ends are at the same end of the assembly. Alternatively, the fusion weld element may comprise one strand, or two or more parallel separate strands and power connections may be made by energizing leads connected to the fusion welding element at each end of the half-shell.

FIG. 12 also shows two tabs 160, 260 which are surplus with respect to the final tubular body 123. Tabs 160, 260 extend from the joining surfaces (faces) 138, 238 of the ends of the half-shells 122, 222, a the location where the ends of loop type fusion weld element 146 exit the joint between the half-shells. When the fusion weld element melts, the tabs are also partially melted. After the weld cools, the tabs and portions of fusion weld elements which are captured therebetween are removed, as by means of a sharp chisel or the like, leaving a smooth end surface on the now-formed tubular body 123. In the absence of the tabs, there may be a depression in the end surface where the fusion weld element remains are cut off, and that could upset subsequent welding of the end.

When fabricating a tank 120 like that shown in FIG. 6, two like tubular bodies 123 are fabricated. The one is then welded to the other at flanges 138, to form circular joint 134. Alternatively, the second tubular body is not used, and the end cap is attached to the first body 123 instead. That process of making end-joints is now described.

Figure 9A:
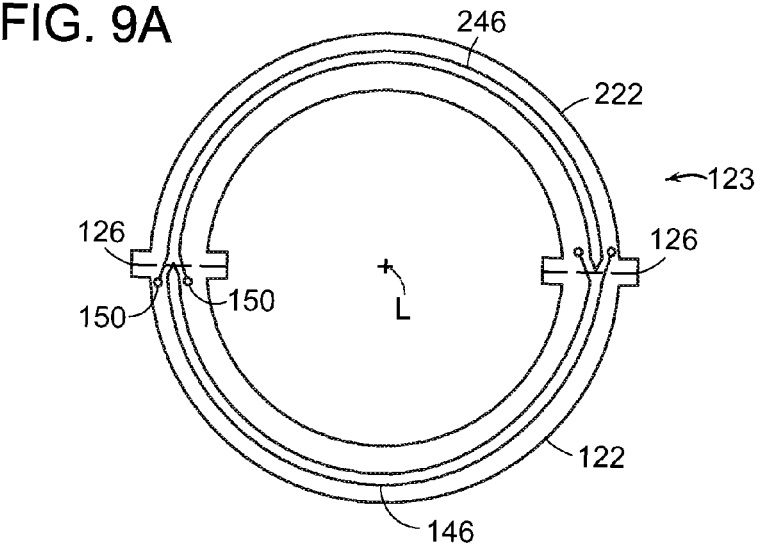
FIG. 9A is an end view shown the half-shells in FIG. 9 after they are mated.
Figure 10:
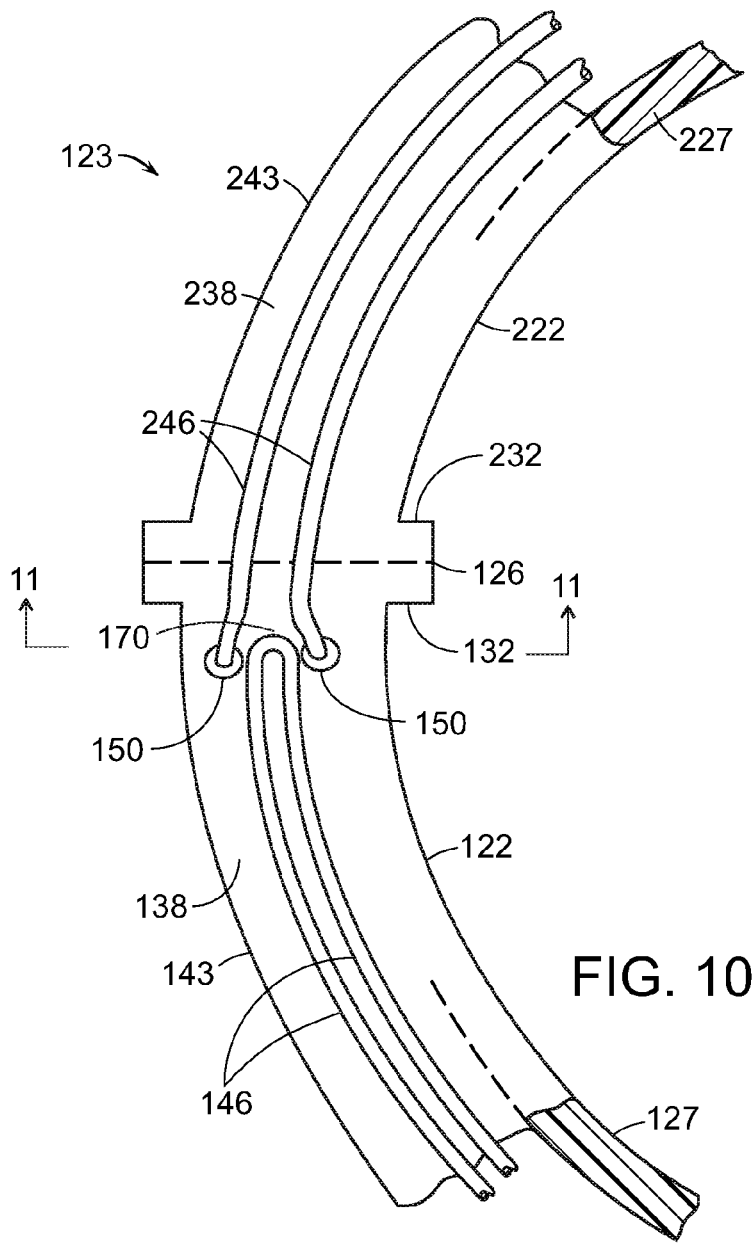
FIG. 10 is a partial end view of the joint a subassembly comprised of two fused half-shells, showing how loop type fusion weld elements run on a circumferential joining surface, and how the ends of one fusion weld element overlaps the loop end of the other.
Figure 11:
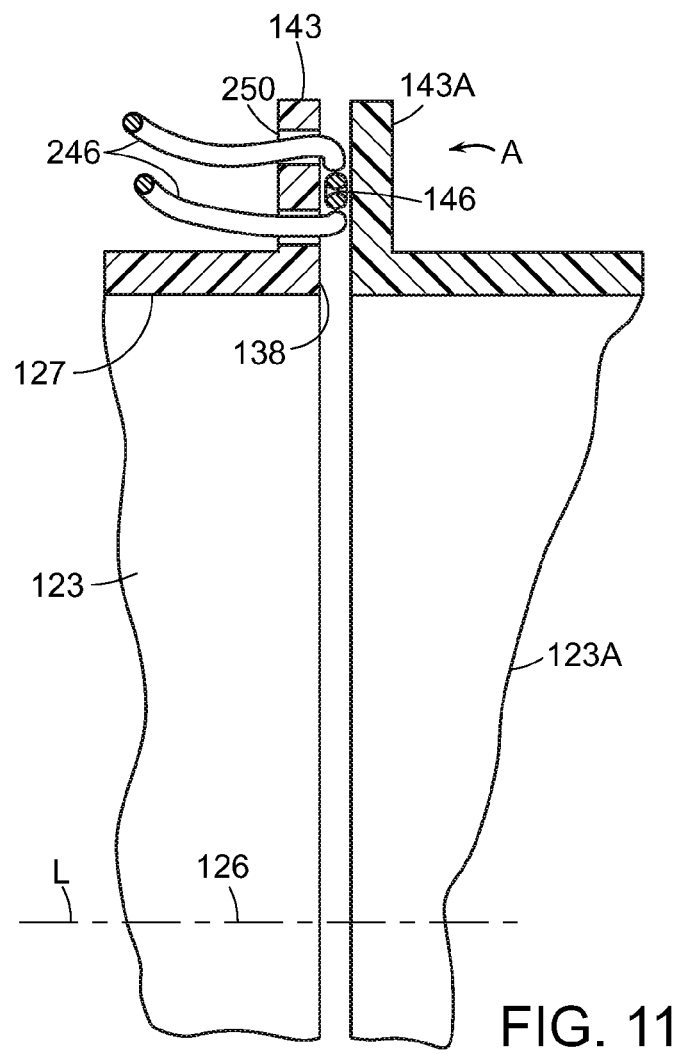
FIG. 11 is a fragmentary lengthwise cross section showing how the lengthwise end of a tank tubular body mates with a like tubular body, and how a fusion weld element is captured in the joint.

FIG. 9A is an end view of the tubular body 123 that is formed when the two half-shells 122, 222 shown in FIG. 9 are welded to each other at joint 126. FIG. 10 is a partial more detailed view of the end of body 123 which is shown in FIG. 9A. FIG. 11 is a partial lengthwise cross section through tubular body shown in FIG. 10, with the addition of a second tubular body 123A having a flange 143A which is configured and positioned for welding to the end of tubular body 123.

With reference to FIGS. 9, 9A, 10 and 11 the fusion weld element 246 is in the form of a loop; the element is secured to the faying surface 238 of half-shell 222. The free ends run across the joint 126 between the two half-shells and then through spaced apart holes 150 in the circumferential flange 143 of part 122, to exit from the flange face opposite the faying surface. The loop end 170 of the fusion weld element 146 that is secured to the faying surface 138 of flange 143 of half-shell 122 is positioned with respect to the holes 150 so that there is circumferential overlap between the free ends of fusion weld element 246 within the joint and the loop end 170 of fusion weld element 146. Similarly, as shown in FIG. 9A, there is like overlap between the loop end of fusion weld element 246 and the terminal ends of loop 146, on the diametrically opposite side of the tubular body.

Figure 10A:
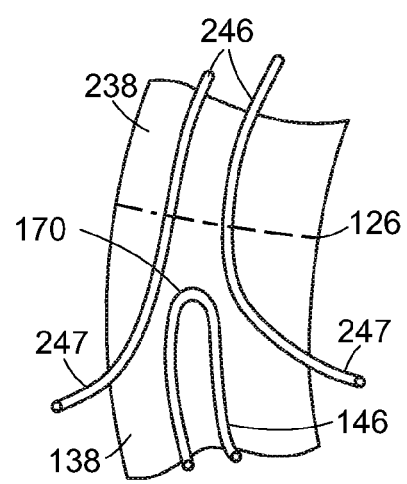
FIG. 10A is a fragmentary view like FIG. 10, showing an alternate embodiment of fusion weld element arrangement.

In an alternate way of carrying out the invention, the holes 150, in a flange may be omitted and, as shown in FIG. 10A the terminal ends 247 of fusion weld element 246 may be run on an overlapping but diverging path, with one end exiting from the joint region radially inward and the other exiting radially outward.

The foregoing method of using two separate semi-circumferential fusion weld elements provides good melting of the faying surfaces at the locations where the fusion weld elements meet each other. And using two separate fusion weld elements on the end of a tubular body 123 enables a manufacturer to pre-place the fusion weld elements on the half-shells prior to shipment of the half-shells to storage or to a remote site where the body 123 may be formed from the half-shells without required skilled placement of the fusion weld elements at the remote site.

A principle within the foregoing methodology is that each fusion weld element has an arc length on the faying surface of the end of tubular body 123 that is greater than the arc length of the path on the faying surface of a half-shell where the fusion weld element is tacked. Stated again, the fusion weld element length is greater than the length of a semi-circumference arc, in the particular case where the tubular body is comprised of half-shells). The ends of the foregoing arc on the faying surface is the length of an arc running between the points where the circumferential faying surface meets the lengthwise faying surface of a half-shell.

As illustrated by side cross section view of FIG. 11 and vector A, the parts are desirably urged toward each other as the fusion weld element melts. Upon melting, the fusion weld element merges with the plastic of the flanges and the gap between the joining surfaces closes up and a tight fused joint 134 is formed. If desired one or more additional tubular bodies may be formed and attached to the just-made assembly in like manner.

Next, end caps 124 are attached to each end of the partially formed tank (the "grander assembly") comprised of two tubular bodies 123. From the foregoing description, it will be appreciated that one end of the grander assembly will be characterized by a circular surface having fusion weld elements arranged as described in FIG. 9, and the process for making the cap-to-body joint will be as just described. The other end will be free of fusion weld elements.

To attach a cap to the end of the grander assembly having no fusion weld elements, in accord with the exemplary embodiment described here, there is a choice of approaches. First, to make the tubular body 123 which is the "last" of a multiplicity of welded bodies 123, special half-shells may be used: each will have a semi-circumference loop running on both ends of the half-shells, rather than on one end only. Second, with reference to FIG. 14, an end cap 324 may be provided that has a fusion weld element loop 346 running around the circumference of the faying surface 342 of the end cap, preferably with holes 350 like the holes 150 and the same arrangement of loop end and terminal ends as described in connection with FIG. 10. Alternatively, the fusion weld element may be run on the end cap as two separate loop segments, as described. Alternatively, a single strand of fusion weld element may be used, or a spiraling-upon-itself fusion weld element may be used.

In other embodiments of the invention, for any of the joints, a single strand, or multiple strands, or loops of fusion weld elements may be used interchangeably, although the preference is for the loop type fusion weld element configurations which have been pictured here. While tack welding of a fusion weld element to joining surfaces as described is preferred, other ways of pre-placing or holding a fusion weld element in position may be used. For instance, a fixture may be used. In other embodiments of the invention, a different sequence of joining the parts together may be used than has been described by example.

Figure 15:
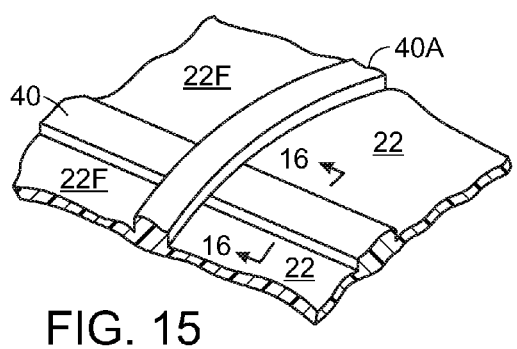
FIG. 15 is a partial view of a tank body showing splices/bands on the joints between the mating parts.
Figure 16:
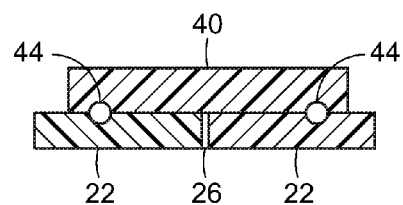
FIG. 16 is a cross section through a portion of the tank body and band shown in FIG. 15.

FIG. 15 and FIG. 16 show another way in which exemplary parts 22 may be attached to each other, and mutually joined to parts 22F. A splice 40, also called a lap band 40, lies on top of the parts 22 at the location of joint 26 between mating parts. In the FIG. 16 cross section view, before welding, band 40 includes captured-opposing fusion weld elements 44. When the fusion weld elements 44 are raised in temperature the band is fused to the surfaces of the half-shells 22 at locations spaced apart from the joint 26. As shown in FIG. 15*tt* one band 40 may be crossed by another right-angled band 40A when the tank has intersecting joints. Preferably, the first band would be fused to the tank parts before the second right-angled band is fused. A lap band may lessen the need for having precise joint fit. Optionally, a seal (not shown) may be placed within joint 26 when using a lap band.

The mated parts may be urged together or held in intimate contact during the fusion welding process by means such as weights, fixtures, clamps or other temporary or permanent mechanical fastening means. A preferred means is to use a clamp which provides a sustained force so parts move together when the fusion weld element melts. For example spring loaded clamps may be used; alternately, pneumatically or hydraulically actuated clamps may be used.

Preferably, as mentioned, the tank parts (half-shells and end caps) are injection molded or otherwise molded at a factory; and, the fusion weld elements are secured to faying surfaces in the ways described below. Then the tank parts are nested and shipped to a remote site which is a distribution site or near the point of use. The parts are taken from the nested stacks, mated, clamped or fixtured, and welded to each other. They are then transported to the point of use, and as desired, buried or set on the ground.

When an end cap is attached to the both ends of the tank, a whole tank having good strength and integrity is constructed. While tooling in the form of clamps or fixtures is preferred to hold the parts together during joining, within the scope of the invention clamps or fasteners which are left in place may be used in addition or in alternative.

While the invention is described in terms of tubular bodies which are made of half-shells, within the generality of the invention, as mentioned, the tubular bodies may be formed of more pieces, for instance 3 or 4 pieces. Optionally, for enhanced load carrying ability, a number of vertical braces may be placed within the interior of a tank adjacent the port openings, or bosses adapted to receive ports. Preferably, a pair of braces runs from the bottom of the tubular body up to the top of the tank. See commonly owned patent application Ser. No. 13/932,624, filed on Jul. 1, 2013. In the generality of the invention, a tank can have one or more mechanical seal joints in combination with fusion weld joints.

The invention, with explicit and implicit variations and advantages, has been described and illustrated with respect to several embodiments. Those embodiments should be considered illustrative and not restrictive. Any uses of words which relate to the orientation of an article pictured in space are for facilitating comprehension and should not be limiting should an article be oriented differently. Any use of words such as "preferred" and variations thereof suggest a feature or combination which is desirable but which is not necessarily mandatory. Thus embodiments lacking any such preferred feature or combination may be within the scope of the claims which follow. Persons skilled in the art may make various changes in form and detail of the invention embodiments which are described, without departing from the spirit and scope of the claimed invention.

What is claimed is:

1. A method of making a tubular plastic tank or a portion thereof, the tank having a length axis, comprising:
   (a) molding at a first location a plurality of half-shells, each having two lengthwise flanges with lengthwise joining surfaces thereon, and each having opposing end semi-circumferential flanges with semi-circumferential joining surface thereon;
   (b) securing one or more first fusion weld elements to at least one of said lengthwise joining surfaces of each half-shell;
   (c) molding a plurality of end caps, each end cap having a circumferential joining surface, half of which circumferential joining surface is shaped to mate with one of said half-shell semi-circumferential joining surfaces;
   (d) positioning one or more second fusion weld elements on one or more half-shell semi-circumferential joining surfaces or on the circumferential joining surface of at least one end cap;
   (e) nesting the half-shells within each other and nesting the end caps within each other; then transporting the nested half-shells and the nested end caps to a second location that is remote from the first location; then,
   (f) mating the lengthwise joining surfaces of two half-shells to each other to form an assembly having two lengthwise joint regions, each joint region capturing at least one first fusion weld element;
   (g) melting said one or more first fusion weld elements by applying electrical or electromagnetic energy thereto, thereby to form a first tubular body having two opposing side lengthwise weld joints and opposing first and second ends, each end comprising a circumferential flange with a joining surface thereon;
   (h) mating at least a first end cap to the first end circumferential flange of the first tubular body, to form an assembly having a circumferential joint region capturing at least one said second fusion weld elements; and,
   (i) melting said at least one second fusion weld element by applying electrical or electromagnetic energy thereto; to thereby join the first end cap to the first tubular body.

2. The method of claim 1 which further comprises:
mating two additional half-shells to each other to form a second tubular body like the first tubular body and joining the second tubular body to the first tubular body by securing one or more third fusion weld elements to the second circumferential flange end of at least one of the tubular bodies;
mating the first tubular body and the second tubular body so said one or more third fusion weld elements are captured in a circumferential joint region therebetween;
melting said one or more third fusion weld elements by applying electrical or electromagnetic energy thereto; to thereby join the second tubular body to the first tubular body.

3. The method of claim 1 which further comprises: after step (i), attaching a second end cap to the second circumferential flange end of the first tubular body.

4. The method of claim 1 wherein, during step (b) said at least one or more first fusion weld elements is secured to one only of the lengthwise joining surfaces of each half-shell.

5. The method of claim 1 wherein at least one of the first fusion weld elements is secured to each joining surface by either tack welding or placement in a groove.

6. The method of claim 1 wherein said at least one or more first fusion welding elements which is secured to the lengthwise joining surfaces during step (b) is of the loop type and has a pair of terminal ends which exit from the end of a lengthwise joint region in step (f).

7. A method of making a tubular plastic tank or a portion thereof, the tank having a length axis, comprising:
(a) molding a plurality of half-shells, each having two lengthwise flanges, each flange having a lengthwise joining surface thereon; each half shelf comprising opposing end semi-circumferential flanges, each flange having a semi-circumferential joining surface thereon; wherein each lengthwise flange has a tab extending from one or both ends thereof, each tab comprising a tab surface which is parallel to the lengthwise joining surface of the flange;
(b) securing one or more first fusion weld elements to at least one of said lengthwise joining surfaces of each half-shell, at least one first fusion weld element configured for running across one of said tab surfaces;
(c) nesting the part-shells within each other and nesting the end caps within each other; then transporting the nested part-shells and the nested end caps to a second location that is remote from the first location; then,
(d) mating the lengthwise joining surfaces of two half-shells to each other to form an assembly having two lengthwise joint regions and at least one pair of mated tabs, each joint region and each pair of mated tabs capturing said one or more first fusion weld elements;
(e) melting said first fusion weld elements by applying electrical or electromagnetic energy thereto, thereby to form a first tubular body having two opposing side lengthwise weld joints and opposing ends having first and second ends, each end comprising a circumferential flange with a joining surface thereon;
(f) mating at least a first end cap to a first circumferential flange end of the first tubular body, to form an assembly having a circumferential joint region capturing an at least one second fusion weld element; and,
(g) melting said at least one second fusion weld element by applying electrical or electromagnetic energy thereto; to thereby join the first end cap to the first tubular body; and (h) severing the tabs from the half-shells which then comprise said first tubular body.

8. A method of fabricating a plastic tank or a portion thereof, the tank having a length axis, which comprises:
(a) molding at a first location a plurality of part-shells, each having two lengthwise flanges with lengthwise joining surfaces thereon, and each having opposing end part-circumferential flanges with part-circumferential joining surface thereon;
(b) securing one or more first fusion weld elements to at least one of said lengthwise joining surfaces of each part-shell;
(c) molding a plurality of end caps, each end cap having a circumferential joining surface, part of which joining surface is shaped to mate with part of one of said part-shell part-circumferential joining surfaces;
(d) securing one or more second fusion weld elements to said one or more part-circumferential joining surfaces of the part-shells or to the circumferential joining surface of at least one end cap;
(e) nesting the part-shells within each other and nesting the end caps within each other; then transporting the nested part-shells and the nested end caps to a second location that is remote from the first location; then,
(f) mating the lengthwise joining surfaces of a multiplicity of said part-shells to form a tubular shape assembly having two or more lengthwise joint regions, each joint region capturing said one or more first fusion weld elements;
(g) melting said first fusion weld elements by applying electrical or electromagnetic energy thereto, thereby to form a first tubular body having two or more lengthwise weld joints and opposing ends having circumferential flanges with joining surfaces thereon;
(h) mating at least a first end cap to a circumferential flange end of the first tubular body, to form an assembly having a circumferential joint region capturing at least one said second fusion weld element; and,
(i) melting said at least one second fusion weld element by applying electrical or electromagnetic energy thereto; to thereby join the first end cap to the first tubular body.

9. The method of claim 8 which further comprises: after step (g), attaching a second end cap to a circumferential flange end of the first tubular body using the same method as was used to attach the first end cap.

10. The method of claim 8 wherein each of said one or more first fusion weld elements has a terminal end for connection to a source of electric energy, further comprising:
forming each said part-shell with one or more tabs, each tab extending from an end of the part-shell lengthwise flange with a tab surface parallel to the lengthwise joining surface of the flange;
wherein when the part-shells are mated as the tubular shape assembly in step (f) the terminal end of each fusion weld element that is captured in the joint region is captured between mating surfaces of two said tabs; and,
after carrying out said melting and welding step (f), severing the tabs from the part-shells which then comprise said first tubular body.

11. The method claim 7 further comprising: (f) molding at least one cap having a circumferential joining surface, mating said surface with a circumferential flange joining surface of the first tubular body and welding the end cap joining surface to the first tubular body circumferential end joining surface.

12. The method of claim 1 wherein in step (d) two second fusion weld elements are provided, each second fusion weld element in the form of a loop having a loop end and free ends, and each second fusion weld element running around the semi-circumferential joining surface of a half shell with a length such that, when two half shells are mated in step (f), the free ends of one second fusion weld element circumferentially overlap the loop end of the other second fusion weld element on the circumferential flange joining surface at an end of the first tubular body which is formed in step (g).

13. The method of claim 12 wherein, after step (g), the free ends of a second weld element loop that is secured to the flange of one half-shell are run through holes in the joining surface of the semi-circumferential flange of the mating half-shell.

14. The method of claim 7 wherein in step (c) a two second fusion weld elements are provided, each in the form of a loop having a loop end and free ends, and each second fusion weld element runs around the semi-circumferential joining surface of a half shell with a length such that, when two half shells are mated and welded in steps (e) and (g), the free ends of one second fusion weld element circumferentially overlap the loop end of the other second fusion weld element on the circumferential flange joining surface at an end of the first tubular body.

\* \* \* \* \*